United States Patent [19]
Zamplas et al.

[11] Patent Number: 5,847,664
[45] Date of Patent: *Dec. 8, 1998

[54] REMOTE CONTROL ASSEMBLY FOR OPERATING AUDIO COMPONENTS IN MOTOR VEHICLES

[75] Inventors: George J. Zamplas, Novi; James H. Repp, Canton; John E. Rauch, Sterling Heights, all of Mich.

[73] Assignee: Chrysler Corporation, Auburn Hills, Mich.

[ * ] Notice: The term of this patent shall not extend beyond the expiration date of Pat. No. 5,721,541.

[21] Appl. No.: 946,821

[22] Filed: Oct. 8, 1997

Related U.S. Application Data

[63] Continuation-in-part of Ser. No. 758,629, Nov. 27, 1996, Pat. No. 5,721,541, which is a continuation of Ser. No. 422,464, Apr. 17, 1995, abandoned.

[51] Int. Cl.$^6$ ..................................................... H03K 17/94
[52] U.S. Cl. ............................ 341/20; 341/33; 340/425.5
[58] Field of Search ........................... 340/425.5, 825.69, 340/825.72; 341/20, 22, 173, 174, 176; 455/602; 345/161

[56] References Cited

U.S. PATENT DOCUMENTS 5,721,541 2/1998 Repp et al. ............................... 341/22

*Primary Examiner*—Daniel J. Wu
*Attorney, Agent, or Firm*—Mark P. Calcaterra

[57] ABSTRACT

A remote control assembly for operating an audio component in a motor vehicle includes a steering wheel having a front side and a back side, and a control for operating a function of the audio component located on the back side of the steering wheel such that a driver's finger can operate the control.

12 Claims, 5 Drawing Sheets

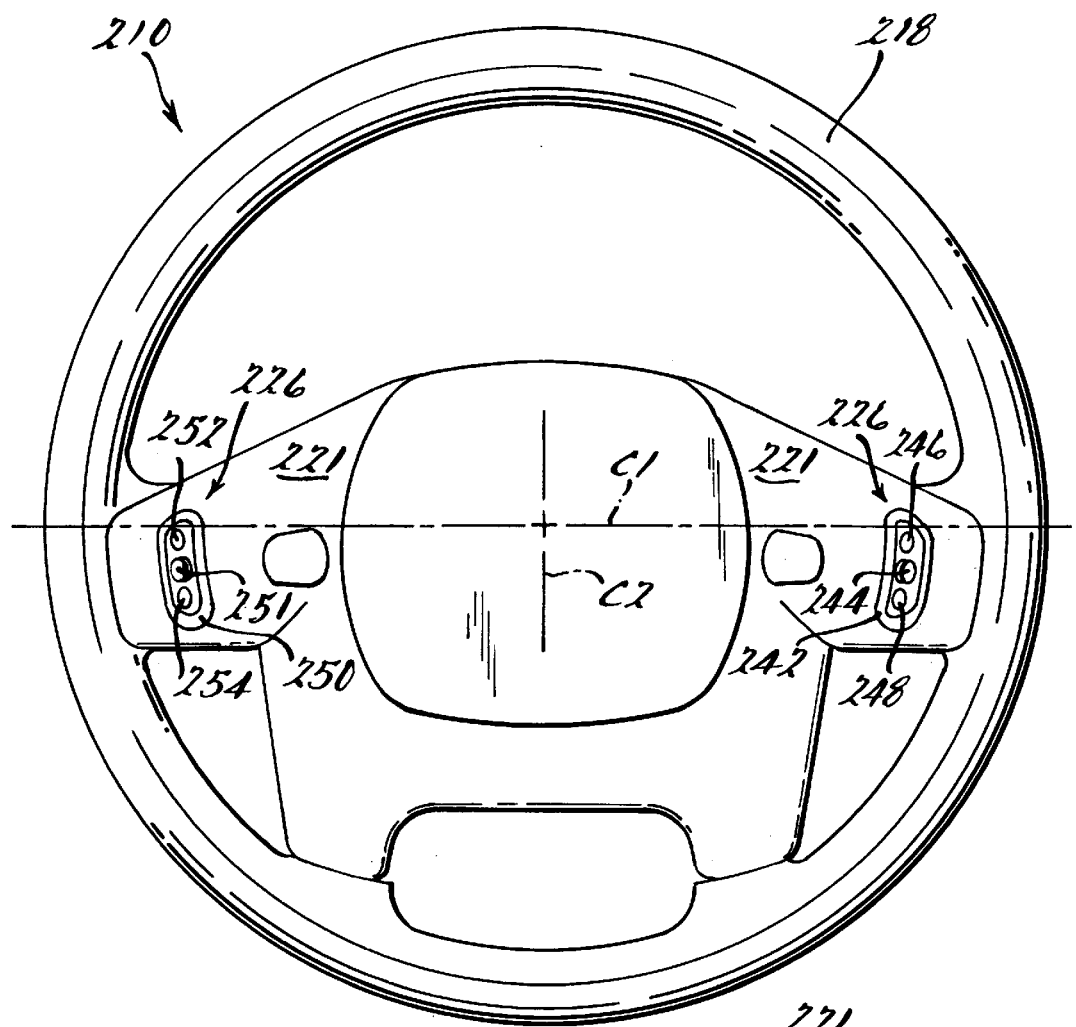
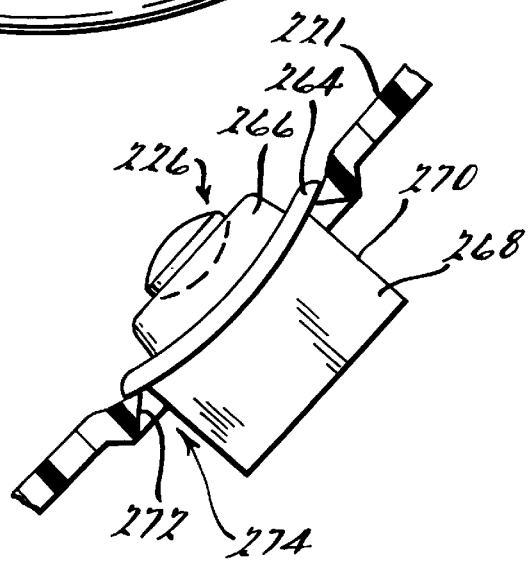

REMOTE CONTROL ASSEMBLY FOR OPERATING AUDIO COMPONENTS IN MOTOR VEHICLES

CROSS-REFERENCE TO RELATED APPLICATIONS

This application is a continuation-in-part of U.S. application Ser. No. 758,629 filed Nov. 27, 1996, now U.S. Pat. No. 5,721,541, which is a continuation of U.S. application Ser. No. 422,464 filed Apr. 17, 1995, now abandoned.

BACKGROUND OF THE INVENTION

1. Technical Field

The present invention relates generally to controls for audio components in motor vehicles and, more particularly, to a remote control assembly for operating audio components in a motor vehicle.

2. Discussion

Audio components such as an AM/FM radio, cassette player, or compact disc player are increasingly popular options on motor vehicles. These audio components are typically located in a center of a dash panel in an occupant compartment of the motor vehicle so that controls for the audio components are reachable by an occupant such as a driver in the motor vehicle. However, in order to operate controls for the audio components, the driver has to lean toward the center of the dash panel, remove a hand from the steering wheel and visually search for the desired control for the audio component. As a result, the driver may be momentarily distracted from driving the motor vehicle.

To make it more convenient for the driver, motor vehicle manufacturers have attempted to place frequently used controls for the audio components, such as a volume control, in a more accessible location. For instance, remote controls for audio components have been placed in an upper portion of the dash panel near instrument panel gages. This location reduces the reaching and visual searching the driver must do to find and operate the remote controls. However, the problem of the driver being distracted from driving the motor vehicle still remains, since the driver must remove a hand from the steering wheel to search for and operate the remote controls.

Some motor vehicle manufacturers have placed controls for audio components on the front of the steering wheel. This location allows the driver to keep a hand close to the steering wheel, and requires minimal visual searching. However, the driver is still distracted from driving the motor vehicle by moving his hand to the front of the steering wheel. Also, there is the possibility that the driver could confuse the controls for the audio components with other controls mounted on the steering wheel, such as a speed control for the motor vehicle.

SUMMARY OF THE INVENTION

It is, therefore, one object of the present invention to provide a remote control assembly for operating audio components in a motor vehicle.

It is another object of the present invention to provide a remote location for a selected audio component control that can be operated "blindly".

It is yet another object of the present invention to provide a remote location for a selected audio component control that is ergonomically intuitive.

It is still another object of the present invention to locate a selected audio component control on a back side of the steering wheel for the motor vehicle.

To achieve the foregoing objects, the present invention is a remote control assembly for operating audio components in a motor vehicle. The remote control assembly includes a steering wheel having a front side and a back side and a control for operating a function of the audio component located on the back side of the steering wheel such that a driver's fingers can operate the control. Controls typically control functions such as volume, seeking a next frequency, preset frequencies, AM/FM, scan to the next frequency, search (for cassette tape or CD players), mute to temporarily eliminate sound, or on/off.

One advantage of the present invention is that an ergonomically intuitive remote location for an audio component control is provided on a back side of a steering wheel for a motor vehicle. Yet another advantage of the present invention is that the controls for the audio components may be "blindly" operated. A further advantage of the present invention is that the driver's hand and eyes are not distracted from the task of driving the motor vehicle when operating the remote audio control on the back side of the steering wheel.

Other objects, features and advantages of the present invention will be readily appreciated as the same becomes better understood after reading the subsequent description taken in conjunction with the accompanying drawings.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 5 is a rear view of the remote control assembly of FIG. 1 illustrating ergonomically positive placement of hands of an operator of the motor vehicle;

FIG. 6 is a rear view of an alternative embodiment of the remote control assembly of FIG. 1;

FIG. 7 is a cross-sectional view of a rocker type switch employed in the remote control assembly of FIG. 6;

DETAILED DESCRIPTION OF THE PREFERRED EMBODIMENTS

Figure 1:
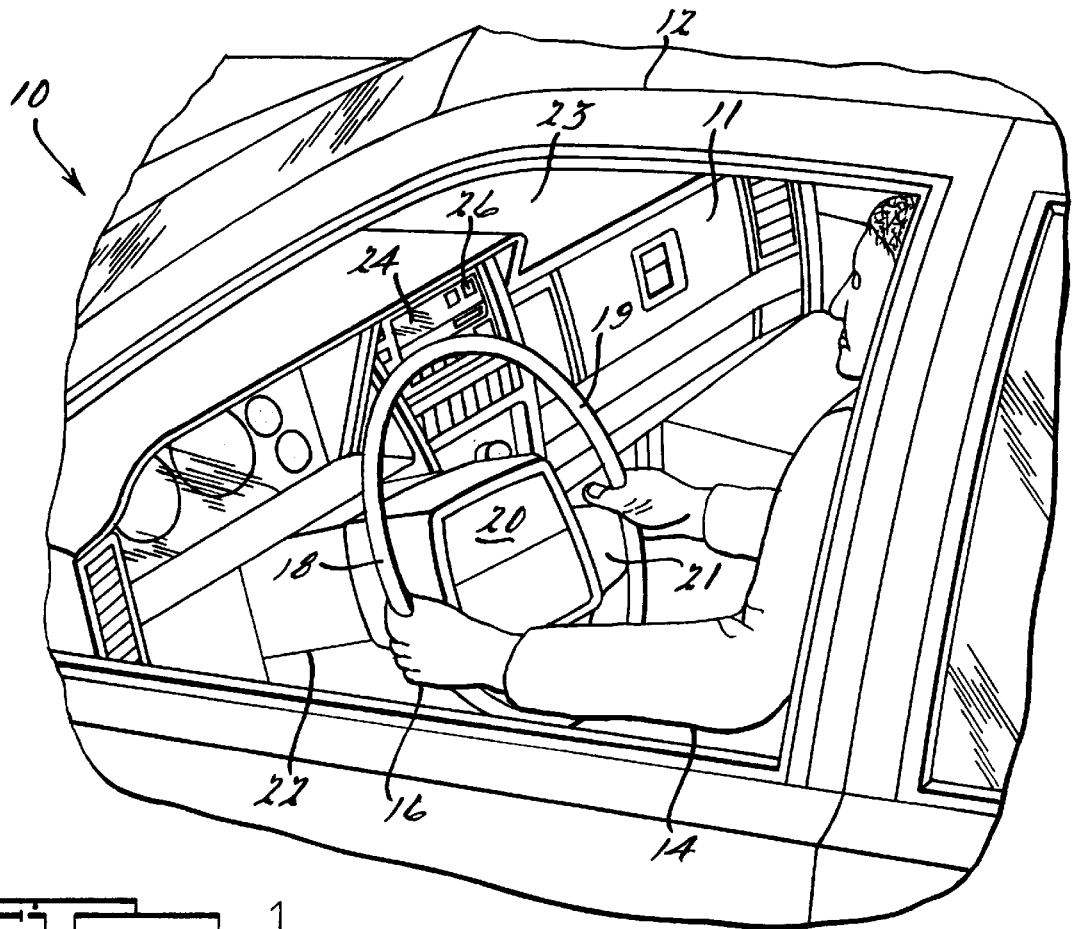
FIG. 1 is a perspective view of a remote control assembly, according to the present invention, for operating audio components and is illustrated in operational relationship with an occupant compartment of a motor vehicle.

Referring to FIG. 1, one embodiment of a remote control assembly, generally shown at 10, for operating audio components 24 is illustrated in operational relationship with an occupant compartment 11 of a motor vehicle 12. In the occupant compartment 11, a vehicle driver 14 having hands 16 are seated in a driver's seat (not shown) of the motor vehicle 12. The driver 14 has his/her hands 16 placed on a steering wheel 18 of the motor vehicle 12 in a typical driving position. The vehicle driver 14 controls the direction of movement of the motor vehicle 12 via the steering wheel 18 as is known in the art.

The remote control assembly 10 includes the steering wheel 18. The steering wheel 18 has a front side facing the driver 14 and a rear side facing a dash panel 23 to be described. The steering wheel 18 includes a circular rim 19, a hub 20 positioned within the rim 19, and a spoke 21 connected at one end to the hub 20 and at the other end to the rim 19. The hub 20 is rotatably mounted onto a steering column 22, which transfers the movement of the steering wheel 18 to a vehicle drive assembly (not shown).

It should be appreciated that the steering wheel 18, steering column 22 and vehicle drive assembly are conventional and known in the art.

The occupant compartment 11 includes a dash panel 23 rearward of the steering wheel 18. The dash panel 23 separates the occupant compartment 11 from an engine compartment (not shown) and houses instrument panel gages, such as a speedometer and fuel indicator, and components such as climate controls and audio components 24. It should be appreciated that the dash panel 23 and its gages and components are conventional and well known in the art.

The audio components 24 are typically positioned in the center of the dash pane 23, so that they are accessible by the driver 14 or a front passenger (not shown). The audio components 24 may include, but are not limited to, a radio, a compact disc player or a cassette player.

The remote control assembly 10 also includes at least one, and preferably a plurality of controls 26 for controlling the operation of the audio components 24. The controls 26 are preferably switches which actuate functions of the audio components 24. In one example, the switches are toggle type switches. It should be appreciated that the functions may include, for example: volume; seek to search for next station in an AM or FM mode or next track in a CD mode; pre-set stations; AM/FM switching; scan to search for next station in the AM or FM mode or the next track in the CD mode; search to find next selection on a tape; mute to eliminate sound; or power (on/off).

Figure 2:
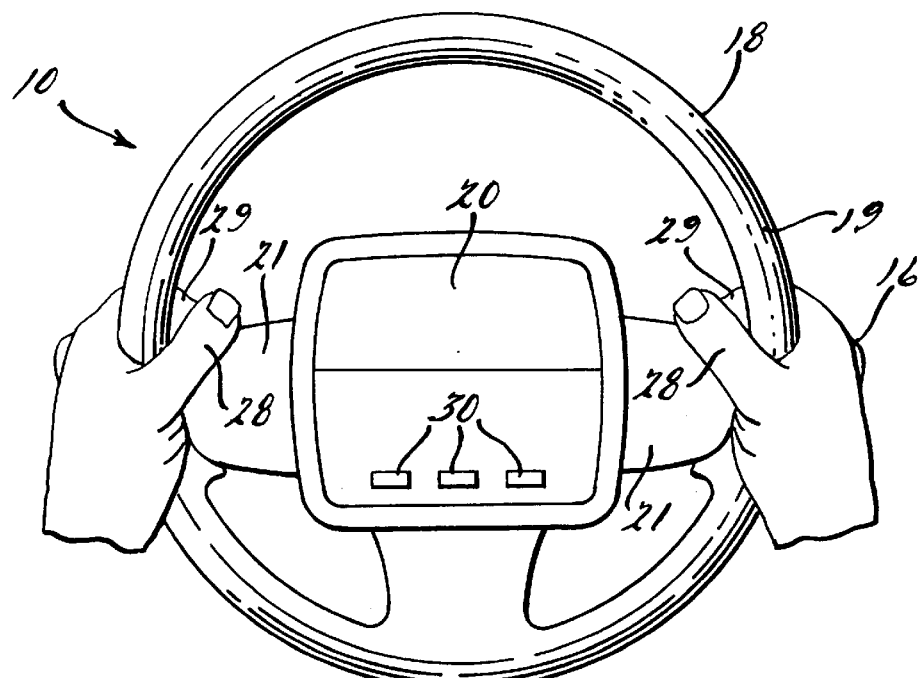
FIG. 2 is a front view of the remote control assembly of FIG. 1.

Referring to FIG. 2, a typical position for the driver's hands 16 on the steering wheel 18 is illustrated. Drivers 14 tend to grip the steering wheel 18 in a comfortable position, especially when driving long distances. A typical position for the driver 14 is to grip the steering wheel 18 with his/her thumb 28 resting on the front side of the spoke 21 and the remaining fingers 29 wrapped around the rim 19 and facing the back side of the spoke 21.

The front side of the steering wheel 18 may also include vehicle controls 30 located on the front side of the hub 20 or the spoke 21. These vehicle controls 30 may include, for example, controls which operate a horn or cruise control. The vehicle controls 30 are readily accessible to the driver 14, however, they are not ergonomically intuitive because the driver 14 may have to visually search for the vehicle controls 30 or move his/her hand 16 around to reach the vehicle controls 30.

Figure 3:
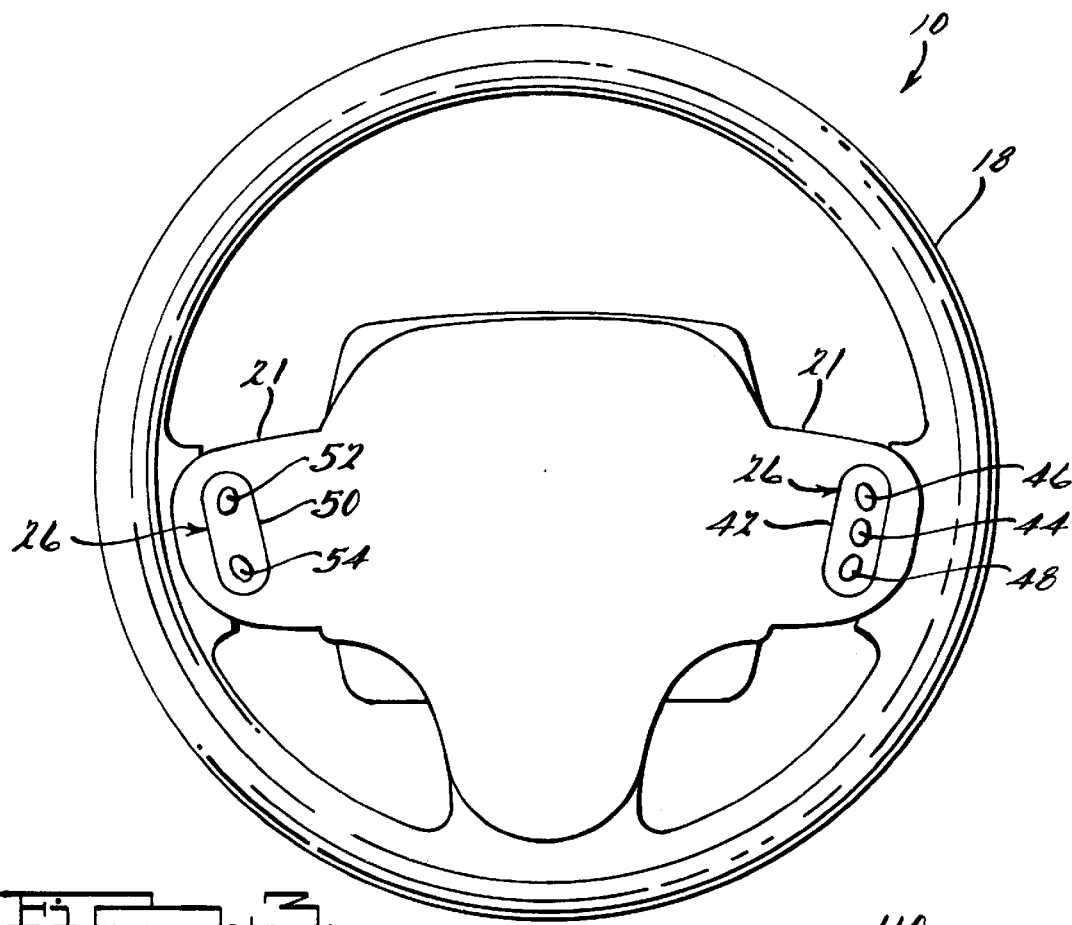
FIG. 3 is a rear view of the remote control assembly of FIG. 1.

Referring to FIG. 3, the remote control assembly 18 includes selected controls 26 placed on the back side of the steering wheel 18 which provide an ergonomic advantage. In one example, the selected controls 26 are a three part rocker switch 42 for a seek function located on a right side spoke 21 of the steering wheel 18. Momentarily depressing a center portion 44 of the rocker switch 42 steps up through preset radio stations; depressing an upper portion 46 of the rocker switch 42 steps up to the next radio station or track; and depressing a lower portion 48 of the rocker switch 42 steps down to the next radio station or track.

Also, in one example, the remote control assembly 18 may include a two part toggle switch 50 for volume control located on a left side spoke 21 of the steering wheel 18. Momentarily depressing an upper half 52 of the toggle switch 50 increases the volume of the audio component 24 that is playing, while momentarily depressing a lower half 54 of the toggle switch 50 decreases the volume of the audio component 24. It should be appreciated that the number and type of control switch is dependent on the function(s) of the audio component 24 to be controlled.

Figure 4:
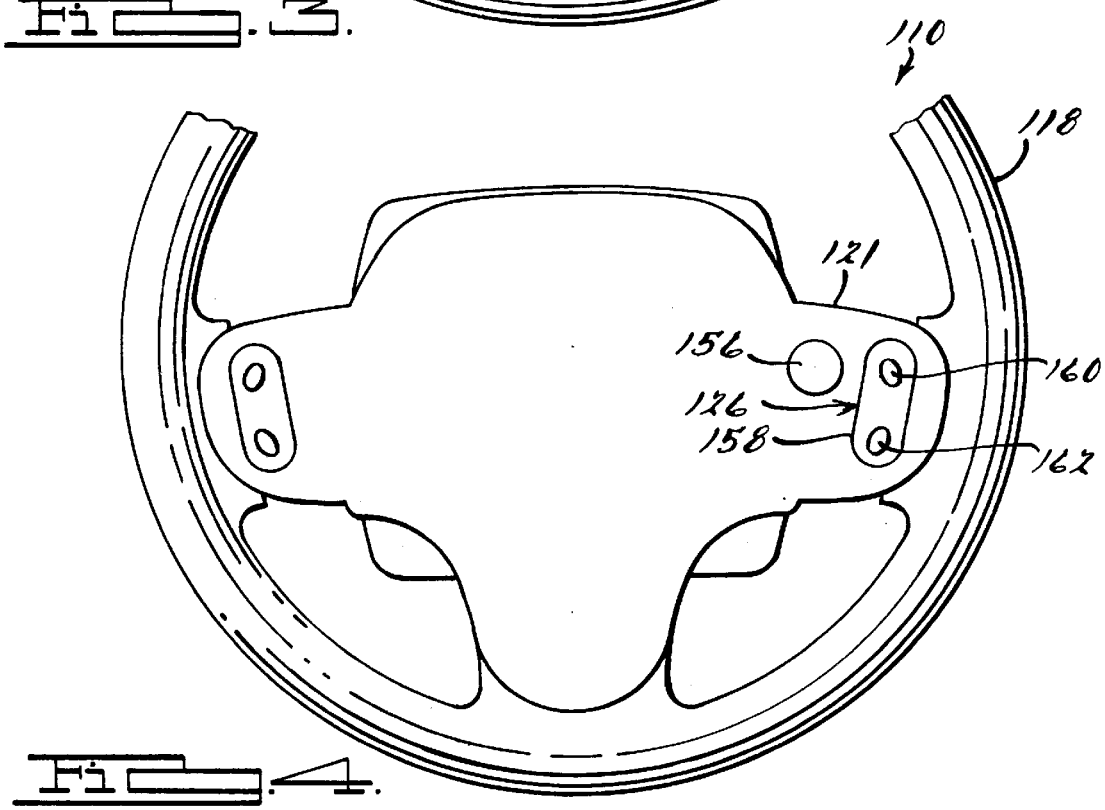
FIG. 4 is a partial rear view of an alternative embodiment of the remote control assembly of FIG. 1.
Figure 3:
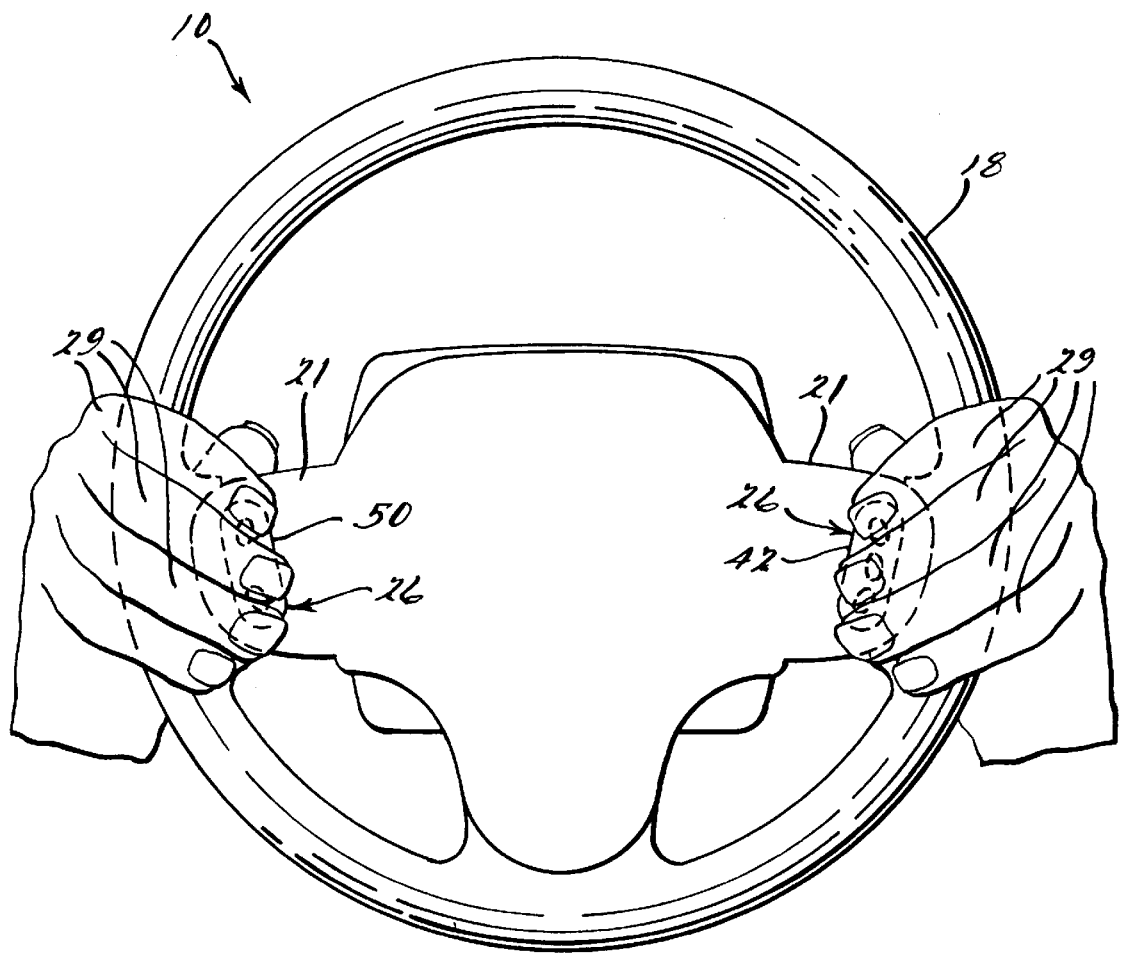

Referring to FIG. 4, an alternative embodiment of the remote control assembly 10 is shown. Like parts have like reference numerals increased by 100. The remote control assembly 110 includes a control 126 for the seek function of the audio component 24. In one example, the control 126 is a preset seek switch 156 as a separate button switch located on the right side spoke 121 of the steering wheel 118 adjacent to a two part rocker switch 158 for seeking up or down of the audio component 24. Pushing the preset seek switch 156 steps up to the next preset radio station, and pressing an upper half 160 of the rocker switch 158 steps up to the next radio station, while pressing a lower half 162 of the rocker switch 158 steps down to the next radio station.

Referring to FIG. 5, the back side of the steering wheel 18 is shown with the placement of the fingers 29 of the driver's hands 16 on the controls 26 to illustrate the ergonomic advantage of the remote control assembly 10. Depending on the design of the steering wheel 18, the controls 26 should be positioned on the back side of the spoke 21 so that they are easily found and operated by a finger 29 of the driver's hand 16.

The location of the controls 26 on the back side of the steering wheel 18 is ergonomically advantageous because the driver's hand 16 naturally rests on the steering wheel 18 with his/her fingers 29 on the back side of the steering wheel 18. Therefore, the driver 14 may blindly operate the switches 42, 50 with removing his/her hands 16 from the steering wheel 18 or taking his/her eyes off the vehicle driving surface.

Referring to FIG. 6, an alternative embodiment of the remote control assembly 10 is shown. Like parts have like reference numerals increased by 200. The remote control assembly 210 includes selected controls 226 placed on the backside of the steering wheel 218 which provide an ergonomic advantage. In one example, the selected controls 226 are a three part rocker switch 242 for a seek function located on a right side spoke 221 of the steering wheel 218. Momentarily depressing a center portion 244 of the rocker switch 242 steps up through preset radio stations. Depressing an upper portion 246 of the rocker switch 242 steps up to the next radio station or track. Depressing a lower portion 248 of the rocker switch 242 steps down to the next radio station or track.

Also, in one example, the remote control assembly 210 may include a second three part rocker switch 250 for volume control located on a left side spoke 221 of steering wheel 218. Momentarily depressing a center portion 251 of the rocker switch 250 switches between AM and FM mode. Depressing the upper half 252 the rocker switch 250 increases the volume of the audio component 24 that is playing, while momentarily depressing a lower half 254 of the rocker switch 250 decreases the volume of the audio component 24. It should be appreciated that the number and type of control switch is dependent on the function(s) of the audio component 24 to be controlled.

It can also be seen that the controls 226 are symmetrically arranged with respect to the center line C1 and C2 of the steering wheel 218 to provide an ergonomic advantage. Furthermore, the selected controls 226 have been placed in close proximity to the center line C1 to provide an ergonomic advantage because the driver's hands naturally rest on the steering wheel 218 with his/her fingers at or near the location of the controls 226. This enables the driver to easily find and operate the controls 226 blindly.

Figure 8:
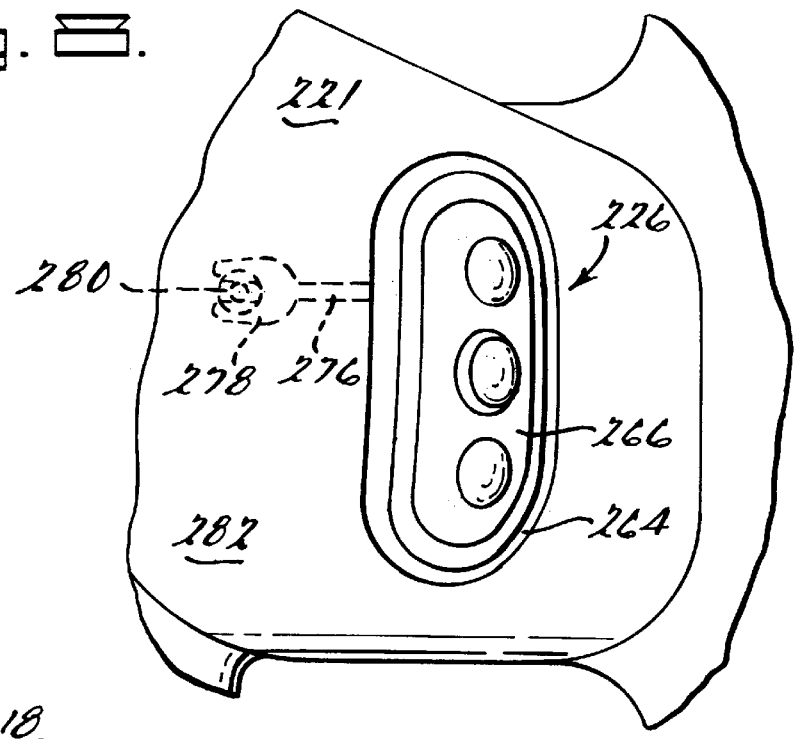
FIG. 8 is a more detailed view of the switch of the remote control assembly of FIG. 6.

Referring to FIG. 7, a cross-sectional view of a control 226 is shown mounted in the spoke 221. The control 226 includes a flange 264 disposed between the switch portion 266 and the base portion 268. As shown is FIG. 8, the flange portion 264 extends substantially about the perimeter of the switch portion 266. The flange portion 264 projects outwardly from the perimeter 270 of the base portion 268 such that it overlies a rim 272 formed about an aperture 274 formed in the spoke 221. The overlap design improves the mountability of the controls 226 into the spoke 221. Furthermore, the overlap design provides an improved tactile response or switch reaction surface for the driver.

The control 226 includes a secondary anti-rattle arm 276 extending laterally therefrom. The anti-rattle arm 276 includes a U-shaped receptacle 278 adapted to cooperate with a screw 280 which is used to mount the back shroud 282 to the infrastructure of the spoke 221. The anti-rattle arm 276 enables the control 226 to be snapped into place through the aperture 274 and onto the spoke 221.

Figure 9:
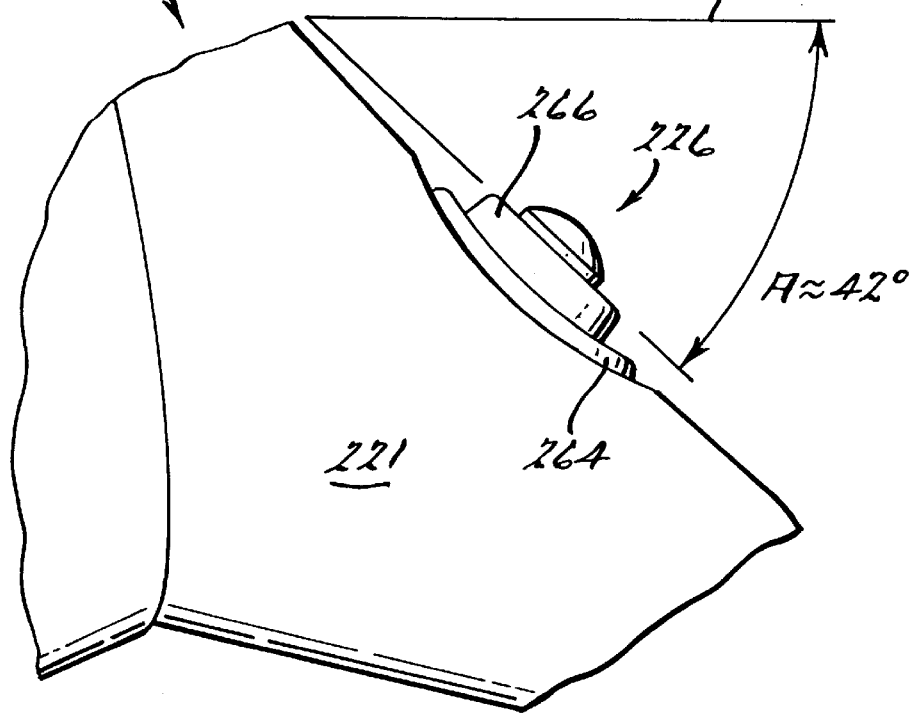
FIG. 9 is a partial side view of the spoke and switch of the remote control assembly of FIG. 6.

Referring to FIG. 9, the side of the spoke 221 is shown with the placement of the control 226 relative to a reference line 284 which is roughly parallel to the tangent plane of the front side of the steering wheel 218. The angle A of the spoke 221 is ergonomically advantageous because a driver's hand naturally rests on the steering wheel 218 with his/her fingers extending at an angle behind the back side of the steering wheel 218. Therefore, the driver may blindly operate the control 226 without having to overly extend his/her fingers or contort them in any unusual fashion. Although the specific angle A may vary, it is presently preferred to form the angle A between 30 and 60 degrees relative to reference line 284 and most preferably to make the angle A approximately equal to 40 degrees. It should be noted that the reference line A is selected to be substantially parallel to a tangent to the front side of the steering wheel or essentially parallel to the tangent of a driver's chest when operating the motor vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A remote control assembly for operating an audio component in a motor vehicle comprising:

a steering wheel having a front side and a back side; and a control for operating a function of the audio component located on said back side of said steering wheel such that a driver's finger can operate said control, said control being located in close proximity to a center line of said steering wheel.

2. A remote control assembly as set forth in claim 1, wherein said control includes a first switch for operating a first function located on said back side of said steering wheel so that said first switch is operable by a finger of a driver's right hand.

3. A remote control assembly as set forth in claim 1, wherein said control includes a second switch for operating a second function located on said back side of said steering wheel so that said second switch is operable by a finger of a driver's left hand.

4. A remote control assembly as set forth in claim 2, wherein said first switch controls a seek function and a preset seek function of the audio component.

5. A remote control assembly as set forth in claim 3, wherein said second switch controls an AM/FM mode function and a volume function of the audio component.

6. A remote control assembly as set forth in claim 1, wherein said control includes a first switch for operating a first function and a second switch for operating a second function, said first and second switches being located on said back side of said steering wheel so that said first switch is operable by a finger of a driver's right hand and said second switch is operable by a finger of a driver's left hand, said first switch and said second switch being substantially symmetrically disposed on said back side of said steering wheel.

7. A remote control assembly for operating an audio component in a motor vehicle comprising:

a steering wheel having a hub, a rim surrounding the hub and at least one spoke attached at a first end to the hub and at a second end to the rim, the hub extending at a preselected angle from the rim to the hub; and a control for controlling a function of the audio component located on a back side of the spoke so that a driver's finger can operate said control, said preselected angle complimenting a natural resting position of a driver's fingers when supported by said rim.

8. A remote control assembly as set forth in claim 7, wherein said preselected angle is between 30 and 60 degrees.

9. A remote control assembly as set forth in claim 7, wherein said preselected angle is approximately equal to 40 degrees.

10. A remote control assembly for operating an audio component in a motor vehicle comprising:

a steering wheel having a front side and a back side, said back side including an aperture formed therein; and a control for operating a function of the audio component located on said back side of said steering wheel such that a driver's finger can operate said control, said control including a flange overlapping a rim defining said aperture.

11. A remote control assembly as set forth in claim 10, wherein said control is secured within said aperture by a snap fit.

12. A remote control assembly as set forth in claim 11, wherein said snap fit is effectuated by cooperation of an arm extending from said control and an infra-structure of said steering wheel.

* * * * *